(12) United States Patent
Engel-Hall et al.

(10) Patent No.: US 9,119,239 B2
(45) Date of Patent: Aug. 25, 2015

(54) GESTURAL CONTROL DIMMER SWITCH

(71) Applicant: ABL IP Holding, LLC, Conyers, GA (US)

(72) Inventors: Aaron Mathew Engel-Hall, San Francisco, CA (US); Peter Y. Y. Ngai, Alamo, CA (US)

(73) Assignee: ABL IP Holding, LLC, Conyers, GA (US)

( * ) Notice: Subject to any disclaimer, the term of this patent is extended or adjusted under 35 U.S.C. 154(b) by 277 days.

(21) Appl. No.: 13/888,184

(22) Filed: May 6, 2013

(65) Prior Publication Data

US 2013/0300316 A1 Nov. 14, 2013

Related U.S. Application Data

(60) Provisional application No. 61/642,999, filed on May 4, 2012.

(51) Int. Cl.
*H05B 37/02* (2006.01)

(52) U.S. Cl.
CPC ............ *H05B 37/02* (2013.01); *H05B 37/0245* (2013.01)

(58) Field of Classification Search
CPC .. H05B 37/02; H05B 37/029; H05B 37/0254; H05B 33/0815; H05B 33/0818; G06F 3/011; G01B 21/16

USPC .......... 315/307, 294, 291, 292, 308; 702/150; 356/615, 614; 345/175, 173; 250/221; 340/555, 567

See application file for complete search history.

(56) References Cited

U.S. PATENT DOCUMENTS

| | | | | |
|---|---|---|---|---|
| 5,336,979 | A * | 8/1994 | Watson et al. ................. | 315/362 |
| 5,594,238 | A | 1/1997 | Endruschat et al. | |
| 7,115,856 | B2 * | 10/2006 | Peng et al. .................... | 250/221 |
| 7,791,595 | B2 * | 9/2010 | Altonen et al. ............... | 345/173 |
| 2005/0146288 | A1 * | 7/2005 | Johnson et al. ............... | 315/291 |
| 2007/0126696 | A1 * | 6/2007 | Boillot .......................... | 345/156 |
| 2010/0013649 | A1 * | 1/2010 | Spira ............................ | 340/664 |
| 2010/0245289 | A1 * | 9/2010 | Svajda .......................... | 345/175 |
| 2011/0019205 | A1 | 1/2011 | Gerber et al. | |
| 2012/0019165 | A1 | 1/2012 | Igaki et al. | |
| 2013/0297251 | A1 * | 11/2013 | Engel-Hall et al. ........... | 702/150 |

* cited by examiner

*Primary Examiner* — Lincoln Donovan
*Assistant Examiner* — Thomas Skibinski
(74) *Attorney, Agent, or Firm* — Brian Beverly; Beeson Skinner Beverly, LLP (57) ABSTRACT

A gestural control dimmer switch for controlling the illumination level of a light using hand movements comprises a dimmer panel in operative communication with a light, the dimmer panel having a plurality of hand position sensors corresponding to a spectrum of illumination levels of the light, wherein when a hand is detected by the hand position sensors the illumination level of the light is set until the hand reaches a dimmer trigger position when the switch enters a dimming mode during which the illumination level is adjusted to the illumination level corresponding to the hand position sensor the presence of the hand is detected until a release condition is satisfied.

11 Claims, 5 Drawing Sheets

GESTURAL CONTROL DIMMER SWITCH

CROSS-REFERENCE TO RELATED APPLICATIONS

This application claims the benefit of U.S. Provisional Application No. 61/642,999 filed May 4, 2012.

BACKGROUND

1. Field of the Invention

The present invention generally relates to dimmer switches, and more particularly to dimmer switches operated by gestural motions, rather than by physically touching the switch.

2. Description of the Prior Art

Potential problems arise in gestural control dimmer switches where the user inputs commands within a continuous spectrum hand detection field formed along a dimmer panel. Touchless dimming is complicated by the fact that downward hand motion cannot always be ignored, as it is sometimes a desired "dimming" action on behalf of the user. It is therefore important for a touchless dimmer system to recognize when a user is attempting to interact with the system and when a user wishes to be ignored. In a light dimming system based on hand gestures this is extremely important since many users will gesture towards the appropriate dim level, but upon reaching this level will then let their hand relax and fall down to their side. If the hand detection field in a gestural control dimmer switch is arranged vertically and the motion of the falling hand is acted upon, the lights will dim down with every interaction. Thus, a gesture-based system must always know when to ignore certain gestures.

Reacting appropriately to gestural commands presents several problems other than the issue of how to properly determine input. The methods by which dimming input is accepted and then translated to the illumination level of the light also pose problems. For example, assume the last user of a dimmer switch has set the light connected to the switch to an 80% illumination level corresponding to a set location along the dimmer panel. If the next user decides to dim the light, he or she will move his or her hand into the hand detection field and initially position it near one end of the panel, typically near the bottom of the panel, at perhaps 20% of the length from the bottom. The system can potentially react to this initial hand position in several negative ways.

In one scenario the system can be set to immediately respond to the initial hand position. This would result in the light immediately dimming from its previous value of 80% illumination level to a 20% illumination level corresponding to the initial position of the user's hand position along the panel. From here, the user could raise or lower his or her hand to brighten or dim the light, respectively. However, the initial drop in the brightness of the light from 80% to 20% can be jarring and undesirable. This problem can be referred to as "introduction jumping."

To avoid "introduction jumping," a gestural control dimmer switch system could be designed not to adjust to the first detected position of the hand. Instead, the system would take the placement of the hand as a new baseline or "home" position and subsequent movement of the user's hand from the new baseline position will brighten or dim the light. For example, if the light is at an 80% illumination level when a user moves his or her hand into the hand detection field, wherever the hand is first placed will be established as a new set point on the panel corresponding to the 80% illumination level. Moving the hand up from this new set point will brighten the light; moving it down will dim it. This avoids the "introduction jump" problem mentioned above, but presents a new problem.

If the last user has dimmed the light to an 80% illumination level, when the next user places his or her hand in the hand detection field at 20% from the bottom of the panel, as indicated above, the physical position of the user's hand at 20% from the bottom of the dimmer panel will be set to correspond to the 80% illumination level of the light. However, the bottom of the panel must still correspond to a 0% illumination level in order to retain the ability to dim the light through a full range of illumination levels. Therefore, all of the dimness values from the 80% illumination level down to a 0% illumination level are compressed into the small range of hand positions corresponding to the physical positions located along the panel between 20% and 0%, such that tiny movements of the hand through the 0% to 20% illumination range would dim or increase the illumination level rapidly with less ability to make fine adjustments. This can be referred to as "over compression." Conversely, the large range of hand positions from the 20% to the top of the panel corresponds to a small increase in the illumination level from 80% to 100% illumination, requiring large movements of the hand to make small changes in illumination level. This problem can be referred to as "over expansion."

The present invention overcomes problems of introduction jump, over compression and over expansion in the operation of touchless dimmer switches.

SUMMARY OF THE INVENTION

The invention is directed to a touchless dimmer switch that does not adjust the level of light brightness when a user places his or her hand in a hand detection field along a dimmer panel until the hand reaches a dimming trigger position. The illumination level remains static after the user's hand enters the switch's hand detection field until it reaches a dimming trigger position along the dimmer panel. When the user's hand reaches the dimming trigger position, the switch locks onto or "sticks" to the hand, in the sense that the switch commences adjusting the illumination level dynamically according to the position of the hand. The illumination level will dynamically adjust corresponding to the position of the user's hand along the dimmer panel commencing with detection of the hand at the dimming trigger position until a release condition is detected such as removal of the hand from the hand detection field, an elapsed time during which there is no hand movement, or a particular hand gesture. The position along the dimmer panel where a release condition is detected may be referred to as the "dimming exit position." When a release condition is detected, the illumination level ceases adjusting according to the position of the user's hand, becoming "unstuck," and the illumination level once again becomes static at the illumination level corresponding to the dimming exit position. The illumination level thus adjusts according to the movement of the user's hand between the dimming trigger position and the dimming exit position. The switch then establishes a new dimming trigger position in the hand detection field corresponding to the dimming exit position.

In another aspect of the invention, a means for visual feedback is provided on or near the dimmer panel to indicate the illumination level in static state, or to show other operating conditions of the switch. The visual feedback alerts the user that the switch has "stuck" to the user's hand at the dimming entry position, and signals changes in the illumination level as the user's hand moves up or down in the hand detection field. In one embodiment, LEDs are provided along one side of the dimmer panel. An LED corresponding in location to the dimming exit position is switched to an "on" state when a release condition is detected. This enables the next user to more easily locate the dimming entry position to initiate changes in the illumination level. In one particular embodiment, an indicator light is switched to an "on" state when the user's hand reaches the dimming trigger position to indicate that the illumination level is dynamically adjusting according to the user's hand position.

DETAILED DESCRIPTION OF THE ILLUSTRATED EMBODIMENTS

An improved gestural control dimmer switch is now described with respect to the accompanying illustrations. FIGS. 1A-1D and 2A-2D illustrate the operation of a gestural control dimmer switch 10 which according to the invention comprises a dimmer panel 12 that controls an associated light 14 as indicated by the broken line. The dimmer panel 12 includes a vertical array of hand position sensors 16 and an adjacent vertical array of indicator lights 18, each indicator light 18 located next to one of the hand position sensors 16. Although in the illustrated embodiment the hand position sensors 16 and indicator lights 18 are arranged in a vertical array, those of skill in the art will understand that the invention is not to be limited to vertical arrays of hand position sensors and indicator lights which can be arranged in many different ways. In one embodiment, a vertical array of analog sensors having overlapping sensor fields, each of which responds to the proximity of a hand with a spectrum of signal strengths, can be used to calculate the centroid of the hand which is taken as hand position. In another embodiment, a vertical array of digial sensors that either sense the proximity of a hand or do not may be used. In a third embodiment, one or more sensors, such as a camera may be positioned in multiple locations to determine a hand position with a high degree of resolution or provide 3D information. In a fourth embodiment, dual sensors with spherical response, such as capacitive sensors, can be used to determine a hand position. In a fifth embodiment, an occlusion with a wall having sensors arranged in an arc can be used to determine hand position. In other embodiments, sensors may be arranged in dispositions other than linearly or arcs, and combinations of different kinds of sensors may be used.

With continuing reference to FIGS. 1A-1D and 2A-2D, each pair of hand position sensors 16 and indicator lights 18 is accompanied by level indicating indicia 20. While in the illustrated embodiment level indicating indicia 20 are numbers 0 to 6, and there are seven individual hand position sensors 16 and indicator lights 18, those of skill in the art will understand that the number of sensors 16, indicator lights 18 and level indicating indicia 20 may be different in quantity and that the level indicating indicia 20 need not be Arabic numerals. In the illustrated embodiment, the bottommost hand position sensor 16 and indicator light 18, which are adjacent number 0, correspond to an "off" level of light 14, the topmost hand sensor 16 and indicator light 18, adjacent number "6," correspond to a full "on" level of light 14, and the interim hand sensors 16 and indicator lights 18 correspond to a spectrum of illumination levels between the off and on levels.

Figure 3:
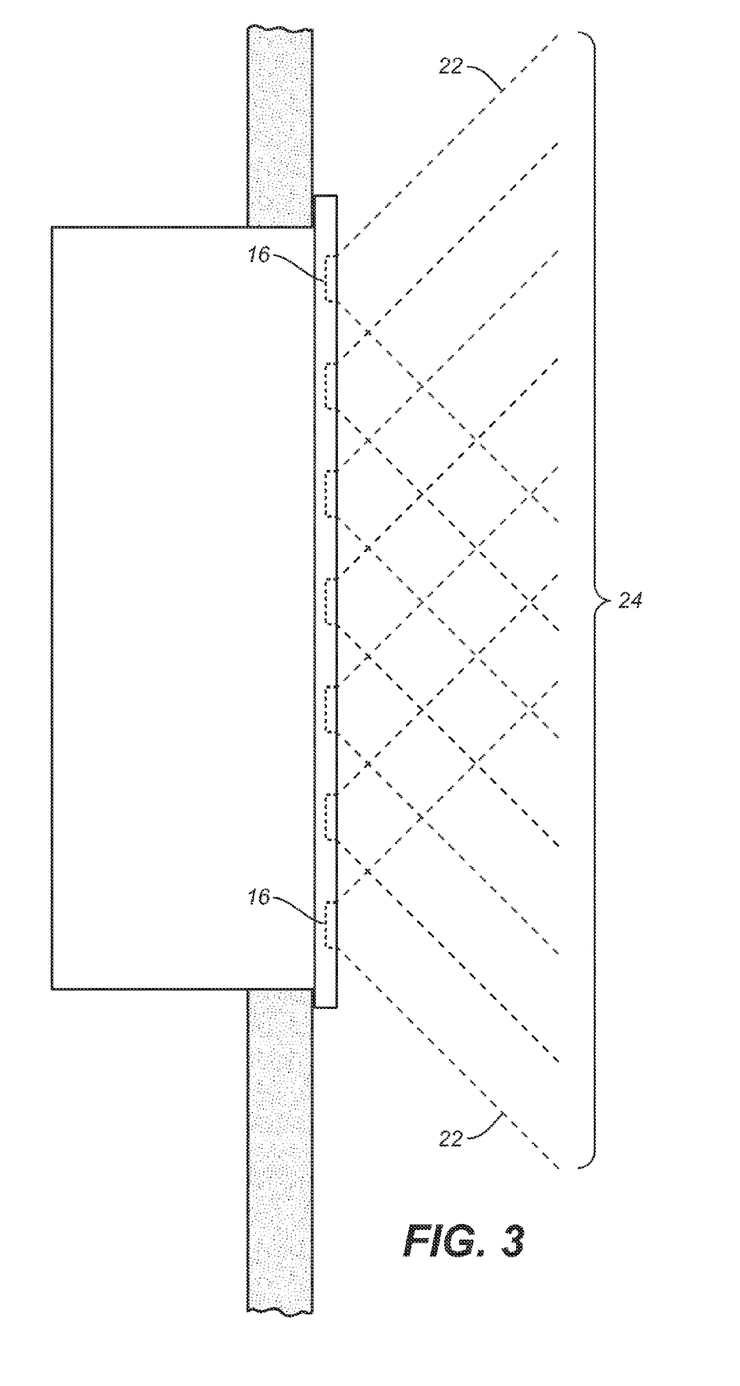
FIG. 3 is schematic representation of a dimmer switch panel showing an exemplary arrangement of hand sensors.
Figure 4:
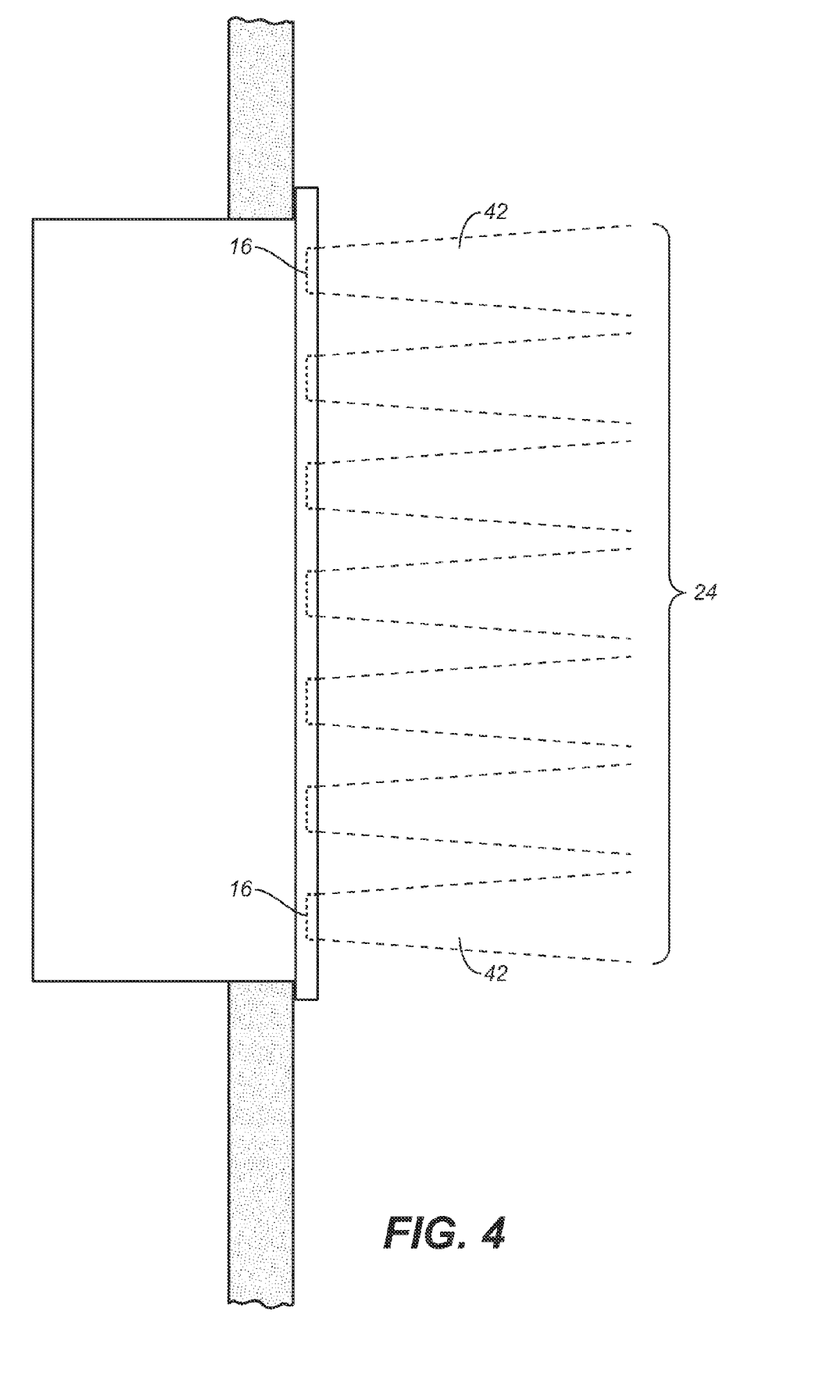
FIG. 4 is a schematic diagram illustrating an exemplary method of tracking and releasing a hand in the hand detection field of a gestural control dimmer switch according to the invention.

With additional reference to FIG. 3 it is seen that each of a plurality of overlapping hand position sensing zones 22 collectively form a hand detection field 24. In one embodiment, the relative strength of the signals from each of the hand position sensors 16 is used to determine hand position. In another embodiment, shown in FIG. 4, the hand position zones 42 are more narrowly focused and each zone 42 is spatially associated with one of the hand position sensors 16 in order to determine hand position.

Figure 1A:
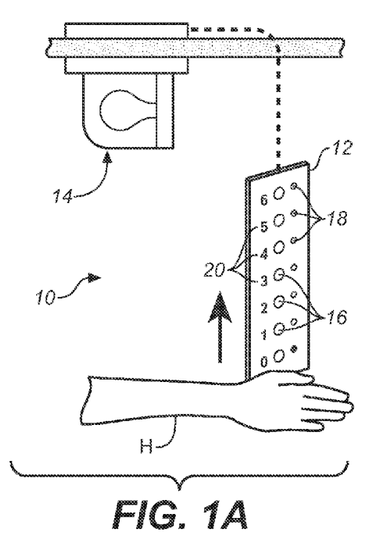
FIG. 1A is a graphical view of a gestural control dimmer switch in accordance with the invention showing the illumination level at the lowest or "off" condition and a hand positioned below the dimmer panel.

FIG. 1A shows that the bottom indicator light 18, adjacent number "0," is illuminated indicating that the illumination level of light 14 is "off" and that the dimming trigger position is adjacent the hand position sensor 16 located at the "0" level. A hand H is shown positioned below the dimmer panel 12 in readiness to initiate an upward hand movement to enter the dimming mode at the dimming trigger position in order to raise the illumination level above the "off" condition. Before the user's hand moves to the dimming trigger position, the illumination level is static.

Figure 1B:
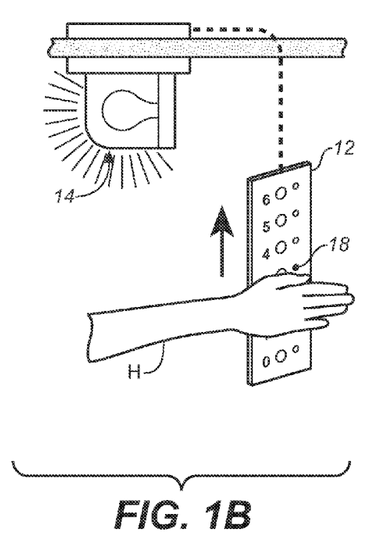
FIG. 1B is a graphical view of the gestural control dimmer switch shown in FIG. 1A showing the hand having moved upward to an intermediate position along the dimmer panel.

FIG. 1B shows that the hand H has been moved upward to an intermediate position between the bottom and the top of the dimmer panel, and that the illumination level has adjusted to level "3" as indicated by the indicator light 18. According to the invention, the user's hand entered the dimming mode at the dimming trigger position adjacent level "0" as shown in FIG. 1A. The dimmer switch then began adjusting the illumination level dynamically according to the position of the user's hand along the dimmer panel. Since the hand has moved to level "3," the illumination level is adjusted to that level. It will be understood that, although the illustrated embodiment shows illumination levels corresponding to and indicated by discrete levels "0" to "6," the invention is not limited to such discrete illumination levels and that there may be more or fewer illumination levels than illustrated or the illumination level may be adjusted along a smooth continuum from off to on.

Figure 1C:
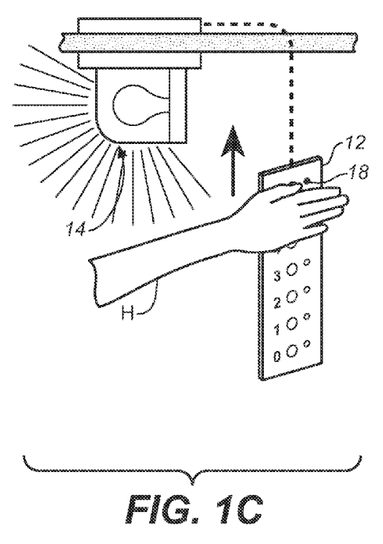
FIG. 1C is a graphical view of the gestural control dimmer switch showing the hand having moved upward to the highest position along the dimmer panel.

FIG. 1C shows that the hand H has been moved upward to the highest position along the dimmer panel thereby increasing the illumination level to the full "on" condition at level "6" as indicated by the adjacent indicator light 18.

Figure 1D:
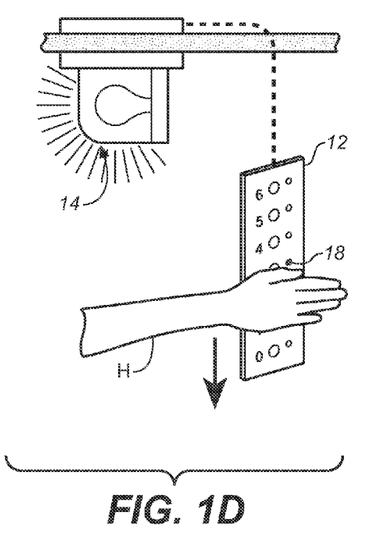
FIG. 1D is a graphical view of the gestural control dimmer switch showing the hand having moved back down to the level "3" position along the dimmer panel.

FIG. 1D shows hand H having moved back downward to level "3" without having exited the hand detection field. If the user removes his or her hand from the hand detection field at this point, the dimming trigger position for the next user will be at level "3."

Figure 2A:
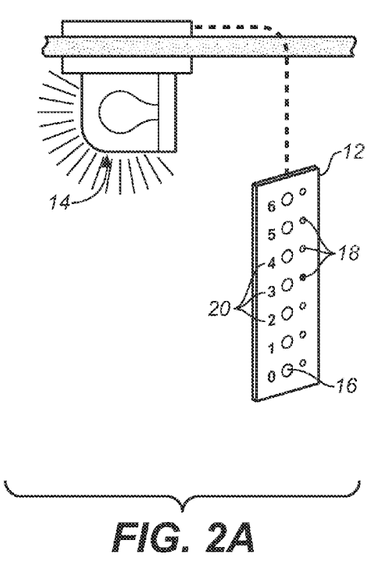
FIG. 2A is a graphical view of the gestural control dimmer switch shown in FIGS. 1A-1D with the hand removed and the illumination level set at level "3."

FIG. 2A shows hand H having been removed from the hand detection field thereby defining the dimming exit position at level "3." The illumination level is thus set at level "3," the indicator light is illuminated at level "3," and the dimming trigger position for the next user is established at level "3."

Figure 2B:
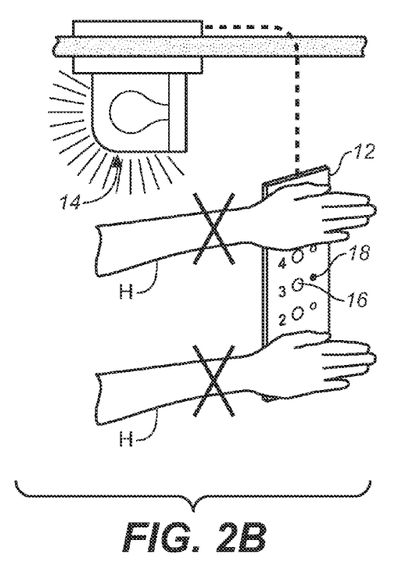
FIG. 2B is a graphical view of the gestural control dimmer switch shown in FIG. 2A showing hand positions that are ignored according to the invention.

FIG. 2B illustrates that if a hand H is positioned within the hand detection field, but above or below the dimming trigger position. Although the switch will track movement of the hand along the dimmer panel, it will ignore movement of the hand for purposes of adjusting the illumination level. The illumination level thus remains static if the hand is detected within the hand detection field, but in regions above or below the dimming trigger position.

Figure 2C:
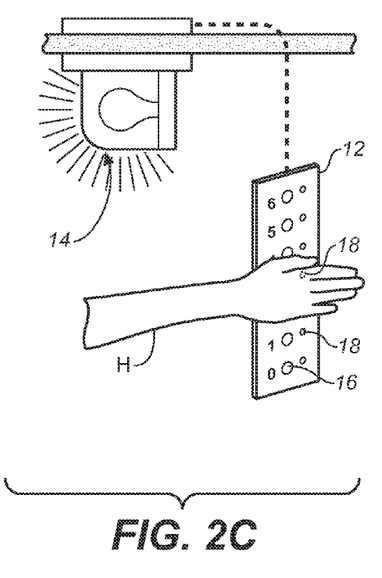
FIG. 2C is a graphical view of the gestural control dimmer switch shown in FIG. 2B showing a hand positioned in the dimming trigger position.

FIG. 2C shows a hand H positioned in the dimming trigger position at level "3," thus triggering entry into the dimming mode of the device during which illumination levels will be adjusted dynamically according to the position of the hand H.

Figure 2D:
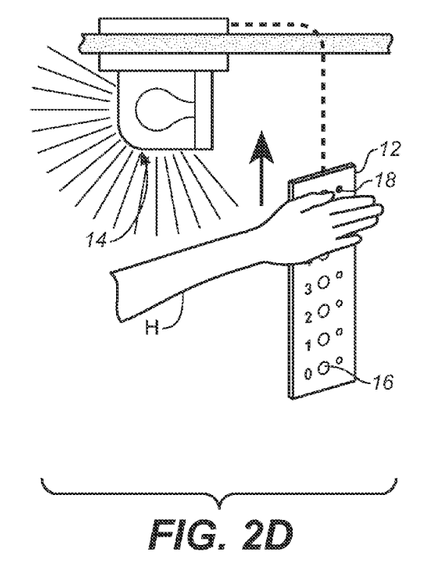
FIG. 2D is a graphical view of the gestural control dimmer switch shown in FIG. 2C wherein the hand has moved up and the illumination level has been adjusted dynamically to level "6."

FIG. 2D shows the hand having been moved up to the level "6" position and the indicator light 18 illuminated confirming that the illumination level has been adjusted to the full "on" condition. If the hand H is removed from the hand detection field, the dimming trigger position will be set at level "6."

Figure 5:
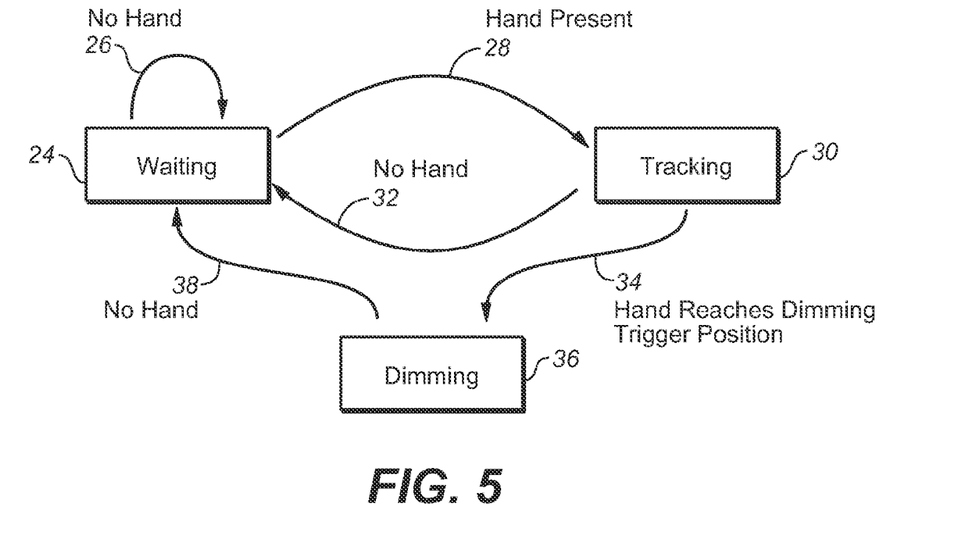
FIG. 5 is a schematic diagram illustrating the relationships between various states of a gestural control dimmer switch according to the invention.

FIG. 5 is a schematic diagram illustrating the relationships between the various states of a gestural control dimmer switch according to the invention. In a waiting mode 24, such as shown in FIG. 2A, the illumination level is static. The system routinely checks to determine if a hand is detected, at 26, and if no hand is detected, the system returns to the waiting mode.

If a hand is detected, as at 28, the system enters a tracking mode 30 and commences tracking the user's hand position as detected along the dimmer panel, as shown in FIG. 2B. If the user's hand is removed from the hand detection field, the switch will return to the waiting mode, as at 32. If, however, the hand crosses into the dimming trigger position, as at 34, the switch will enter a dimming mode 36 as shown in FIG. 2C.

In dimming mode 36, the switch sets the illumination level corresponding to the user's hand position along the dimmer panel and illuminates an indicator light to show the illumination level position such as is shown in FIG. 2D. When the user's hand is removed at a dimming exit position the switch sets the dimming trigger position at the dimming exit position in readiness for the next user. The switch then returns to the waiting mode at 38.

A gestural control dimmer switch is capable of interpreting multiple hand gestures each of which is associated with a specific command. For example, a gesture specific to a "stop interacting" command could be used as long as that gesture can be performed by users easily at any point at which they would like to stop. Alternatively, a "thumbs up" gesture could be performed at which point the dimmer panel will set the dim level as static and ignore any other hand gestures it detects (e.g., the motion of letting the arm relax and drop down to the users side). Active dimming can then be recommenced after the system has detected that the hand has been removed from the hand detection field. Numerous other simple gestures can be detected such as rotation of the hand in place. Users may terminate interaction with the switch by removing the user's hand in a horizontal direction outward and away from the panel until it is no longer within detection range. While horizontal movement is the most suitable direction for detecting disengagement from the switch, other movements are possible.

If gesture recognition is limited and complex gestures like "thumbs up" cannot be distinguished, then a simple pause in the motion of the hand can be used as a cue for release. For example if a hand remains still for a predetermined amount of time then the system can interpret this non-gesture as a stop cue and ignore all hand input until the hand is removed from the system. Note that once the hand is removed the system will again start looking for the hand in order to react the next time someone wishes to dim the light.

In addition, a stop cue can be implemented, which does not cause the system to ignore all input until the hand is removed. Instead the system ignores input for a predetermined amount of time. This allows someone to choose a dim level and pause to stop interaction, but then change their mind and continue dimming in the same motion without the need to remove the hand and begin interaction anew.

A gestural control dimmer switch system such as that described above can provide that an upward motion of the hand results in a brighter light while conversely downward motion will dim the light. A suitable mechanism for tracking upward and downward hand movements is a vertical panel with FULL ON corresponding to the top of the panel and FULL OFF corresponding to the bottom. Those of skill in the art will understand, however, that the invention may be implemented using horizontal hand movements or that a vertically oriented dimmer panel could be arranged with the highest illumination level on the bottom and the lowest illumination level on the top. It will also be appreciated that various forms of hand sensors may be suitable such as by activating sensors by occlusion of a series of pinholes.

Preferably, means of detecting hand gestures of an intuitive nature are provided. For dimming it is naturally felt that raising a hand should brighten a light while lowering a hand will dim it. The specific character of a sweeping motion with the hand and arm upward/downward is the most natural gesture for this type of control.

In addition to the character of the gesture, hand orientation can be used to add further meaning to commands. Thus, similar gestures with distinct body orientations can be used to control different aspects of the dimmer system. For instance, a sweep of the arm with the plane of the palm parallel to the wall can be distinguished from a similar sweep with the palm parallel to the floor, or orienting the palm towards the ground can dim/brighten the light while orienting the palm towards the wall can change the color temperature.

There have thus been described and illustrated certain preferred embodiments of an improved gestural control dimmer switch according to the invention. Although the present invention has been described and illustrated in detail, it is to be clearly understood that the same is illustrative and is not to be taken as limiting, the spirit and scope of the present invention being limited only by the terms of the appended claims and their legal equivalents.

We claim:

1. A gestural control dimmer switch for controlling an illumination level of a light using hand movements, the gestural control dimmer switch comprising:

a dimmer panel in operative communication with the light, the dimmer panel having a plurality of hand position sensors disposed in contiguous disposition and having a first end and a second end opposite said first end, each of said plurality of hand position sensors capable of detecting the presence of a nearby hand, a hand position along said dimmer panel determined from said plurality of hand position sensors, a spectrum of illumination levels extending from a full on condition to a full off condition, said spectrum of illumination levels corresponding to a continuum of positions along said dimmer panel, said full on condition corresponding with said first end of said plurality of hand position sensors said full off condition corresponding with said second end thereof, a dimming trigger position set along said dimmer panel, a dimming exit position located at one of said plurality of hand position sensors where the presence of a hand is last detected, a release condition, a waiting mode during which the illumination level is set at a preexisting illumination level, a tracking mode during which when the presence of a hand is detected by any one of said plurality of hand position sensors the illumination level of the light is maintained at said preexisting illumination level, a dimming mode during which when the presence of a hand is detected by any one of said plurality of hand position sensors the illumination level of the light is adjusted to the illumination level corresponding to said hand position, wherein during said waiting mode if a hand is detected by any one of said plurality of hand position sensors said plurality of hand position sensors enter said tracking mode, during said tracking mode when said hand position is determined to be located at said dimming trigger position said plurality of hand position sensors enter said dimming mode, and during said dimming mode when said release condition is detected said plurality of hand position sensors enter said waiting mode and said dimming trigger position is set at said dimming exit position.

2. The gestural control dimmer switch of claim 1 wherein:
said plurality of hand position sensors are disposed in a vertical array.

3. The gestural control dimmer switch of claim 2 wherein:
said plurality of hand position sensors includes a top hand position sensor and a bottom hand position sensor, and said full on condition of said illumination levels corresponds with said top hand position sensor, and said full off condition of said illumination levels corresponds with said bottom hand position sensor.

4. The gestural control dimmer switch of claim 1 wherein:
a hand detection field within which the presence of a hand is detectable by one or more of said plurality of hand position sensors, and
said release condition includes removal of a hand from said hand detection field.

5. The gestural control dimmer switch of claim 1 further comprising:
a plurality of indicator lights, each indicator light positioned adjacent one of said plurality of hand position sensors,
wherein during said tracking mode the indicator light positioned at said dimming trigger position is illuminated and all the other of said plurality of indicator lights are not illuminated,
during said dimming mode the indicator light adjacent the hand position sensor nearest said hand position is illuminated and all the other of said plurality of indicator lights are not illuminated.

6. The gestural control dimmer switch of claim 1 further comprising:
a plurality of level indicia, each level indicia adjacent one of said plurality of hand position sensors.

7. A gestural control dimmer switch for controlling an illumination level of a light using hand movements, the gestural control dimmer switch comprising:
a dimmer panel in operative communication with the light, the dimmer panel having a plurality of hand position sensors disposed in a vertical array and having a top hand position sensor and a bottom hand position sensor opposite said top hand position sensor, each of said plurality of hand position sensors capable of detecting the presence of a nearby hand, a hand position along said dimmer panel determined from said plurality of hand position sensors, a spectrum of illumination levels of the light extending from a full on condition to a full off condition, said spectrum of illumination levels corresponding to positions along said dimmer panel, said full on condition corresponding with said top hand position sensor, said full off condition corresponding with said bottom hand position sensor, a hand detection field within which the presence of a hand is detectable by one or more of said plurality of hand position sensors, each of said plurality of hand position sensors having an active state and a passive state, in said active state when the presence of a hand is detected the illumination level of the light is adjusted to the illumination level corresponding to said hand position, and in said passive state when the presence of a hand is detected the illumination level of the light is not adjusted, a dimming trigger position set along said dimmer panel, a dimming exit position located at one of said plurality of hand position sensors where the presence of a hand is last detected, a release condition defined by removal of a hand from the hand detection field, a waiting mode during which the illumination level is static, a tracking mode during which all of said plurality of hand position sensors are in said passive state, a dimming mode during which all of said plurality of hand position sensors are in said active state, wherein during said waiting mode if a hand is detected by any one of said plurality of hand position sensors said plurality of hand position sensors enter said tracking mode, during said tracking mode when said hand position is determined to be located at said dimming trigger position said plurality of hand position sensors enter said dimming mode, and during said dimming mode when said release condition is detected said plurality of hand position sensors enter said waiting mode and said dimming trigger position is set at said dimming exit position.

8. A method for controlling an illumination level of a light using hand gestures performed along a dimmer panel, the method comprising:
detecting the presence of a hand in a hand detection field near the dimmer panel,
tracking hand movements within said hand detection field, maintaining the illumination level of the light at a preexisting illumination level during said tracking of said hand movements, detecting the presence of the hand in a preset dimming trigger position associated with said preexisting illumination level, adjusting the illumination level of the light dynamically according to the tracked movements of the hand within said hand detection field, detecting the removal of the hand from said hand detection field at a dimming exit position, setting the illumination level of the light at a level associated with said dimming exit position, and setting a new dimming trigger position at the location of said dimming exit position.

9. The method for controlling the illumination level of a light of claim 8 further comprising:

detecting the presence of a hand in said hand detection field by one or more of a plurality of hand position sensors disposed in a vertical array, said plurality of hand position sensors having a top end and a bottom end, and adjusting the illumination level of the light along a spectrum of illumination levels extending from a full on condition to a full off condition, said full on condition corresponding with the top end of said plurality of hand position sensors, and said full off condition corresponding to the bottom end thereof.

10. The method for controlling the illumination level of a light of claim 9 further comprising:

maintaining the illumination level of the light at a preexisting illumination level during said tracking of said hand movements by not adjusting the illumination level of the light when the presence of a hand is detected by any one of said plurality of hand position sensors, and adjusting the illumination level of the light dynamically according to the tracked movements of the hand within said hand detection field by adjusting the illumination level of the light to the illumination level corresponding to the position of the hand along the dimmer panel as determined by said plurality of hand position sensors.

11. The gestural control dimmer switch of claim 8 further comprising:

detecting the presence of a hand in said hand detection field by one or more of a plurality of hand position sensors disposed in a vertical array, each of said plurality of hand position sensors corresponding to one illumination level in a spectrum of illumination levels of the light extending from a full on condition to a full off condition.

* * * * *

UNITED STATES PATENT AND TRADEMARK OFFICE
CERTIFICATE OF CORRECTION

PATENT NO. : 9,119,239 B2  
APPLICATION NO. : 13/888184  
DATED : August 25, 2015  
INVENTOR(S) : Aaron Mathew Engel-Hall and Peter Y. Y. Ngai Page 1 of 1

It is certified that error appears in the above-identified patent and that said Letters Patent is hereby corrected as shown below:

On the Title Page

Item (57), In the abstract, Line 11, "sensor the presence" should read –sensor that detects the presence–.
Item (57), In the abstract, Line 11, "is detected" should be deleted from between "the hand" and "until a".

In the Specification

In Column 3, Line 39, --a-- should be inserted between "Fig. 3 is" and "schematic".
In Column 4, Line 4, "digial" should read –digital–.
In Column 5, Line 66, "users" should read –user's–.

In the Claims

In Column 7, Line 12, --and-- should be inserted between "sensors" and "said".
In Column 7, Line 52, "wherein" should read –further comprising–.
In Column 7, Line 56, --wherein-- should be inserted before "said release condition".
In Column 7, Line 67, --and-- should be inserted after "not illuminated,".

Signed and Sealed this  
Seventeenth Day of March, 2020

Andrei Iancu  
*Director of the United States Patent and Trademark Office*